3,395,991
RECOVERY OF PROTACTINIUM FROM MOLTEN
FLUORIDE SALTS
Warren R. Grimes and James H. Shaffer, Oak Ridge,
Tenn., assignors to the United States of America as
represented by the United States Atomic Energy
Commission
No Drawing. Filed June 6, 1967, Ser. No. 644,466
8 Claims. (Cl. 23—325)

ABSTRACT OF THE DISCLOSURE

Protactinium values are removed from molten metallic salts by reducing the protactinium values to metal with thorium metal and thereafter contacting the salt with high surface iron to thereby sorb the protactinium metal thereon.

BACKGROUND OF THE INVENTION

This invention relates generally to methods for reprocessing nuclear reactor fuels and more particularly to a method for removing protactinium values from molten metallic salts used in molten salt type reactors.

The invention described herein was made in the course of, or under, a contract with the United States Atomic Energy Commission.

Molten metallic halide salts have been demonstrated as nuclear reactor core and blanket fluids and may be employed in thermal and/or fast converter or breeder reactors. If molten salt breeder reactors are to become efficient as converters, the core and blanket fluids must be periodically or continuously reprocessed to remove high cross section fission products from the core and bred intermediates from the blanket fluids. In the conversion of $^{232}$Th to $^{233}$U in the blanket, $^{233}$Pa is produced as an intermediate and if left in the reactor may capture a second neutron to produce nonfissionable $^{234}$U instead of decaying to fissionable $^{233}$U. Various methods have heretofore been devised to remove the $^{233}$Pa from the blanket salt, such as, for example, by precipitation techniques. This method was disclosed in U.S. Patent 3,110,555 and comprised removing the $^{233}$Pa from the blanket salt by converting the $^{233}$Pa to an insoluble oxide and thereafter separating the oxide from the molten salt. While the process is suitable for removing trace amounts of $^{233}$Pa from blanket salts, it requires the handling of a radioactive oxide precipitate which is soluble to some extent in the salt mixture. It is desirable to provide a method of removing $^{233}$Pa from molten salt mixtures which obviates the handling of such radioactive precipitates.

SUMMARY OF THE INVENTION

The objects of the invention and advantages which will be apparent to those skilled in the art are achieved by the discovery that protactinium values can efficiently be removed from molten salt composition by sorbing the dissolved protactinium, which has previously been reduced to the metal state in the molten salt, on high surface iron. Applicants found, for example, that essentially 100% of $^{233}$Pa could be removed from a molten metallic fluoride salt composition by reducing the $^{233}$Pa to metal with thorium metal and then contacting the molten salt with steel wool.

DESCRIPTION OF THE PREFERRED EMBODIMENTS

In carrying out the invention, the protactinium values, present as fluorides where, for example, the salt composition comprises molten alkali metal fluorides, are first reduced to the metal state in the molten salt composition. For this thorium metal has been found to effectively reduce the protactinium fluoride to protactinium metal in the molten salt composition. This reduction proceeds by the reaction:

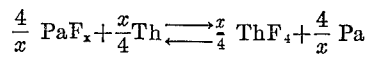

For typical blanket salts the concentration of protactinium is about 25–50 p.p.m. The quantity of reducing metal added to the molten salt is, accordingly, provided in an amount sufficient to reduce substantially all of the protactinium present and may be provided in any convenient form, such as by adding small chips directly to the stream or submerging a small rod in the molten salt stream. For this on a laboratory scale using 1.342 kg. of LiF-BeF$_2$-Th$_4$ (73–2–25 mole percent) salt mixture, five (5) grams of thorium metal chips was effective for the reduction of the protactinium fluoride (<1 p.p.m.) to protactinium metal, requiring about 1–2 hours to reduce better than 95% of the protactinium present.

The protactinium metal is then sorbed on high surface iron, i.e., iron in a finely divided form such as steel wool, to remove it from solution. While applicants do not wish to be bound by any rigid theory, a possible explanation of the sorption phenomenon is that dissolved or colloidal iron co-precipitates with the reduced protactinium and carries the protactinium to the surface of the steel wool. This is advanced on the finding in one experiment of a large amount of iron in the filtered molten salt, which decreased in content as the protactinium was reduced by exposure to thorium, before the salt was exposed to the steel wool. A precise correlation between the ratio of high surface iron to protactinium has not been established; however, 100 grams of steel wool having a surface area of 5.9 m.$^2$ has been found to sorb essentially all of the protactinium metal (initial concentration <1 p.p.m.) from 1.34 kg. of molten salt within 30 minutes after equilibrium had been established between the salt and the steel wool.

The temperature at which the sorption step is carried out may vary over a wide range and generally should be maintained at least 50° C. above the liquidus temperature of the salt to insure a safe margin for process control. Due to increased corrosion and complexity of operation the upper temperature should not exceed about 900° C. which is well below the melting point of steel wool. For a blanket salt composition of LiF-BeF$_2$-ThF$_2$ (liquidus temperature of 560° C.) for the Molten Salt Breeder Reactor a preferred temperature range for carrying out the sorption operation is 600° C.

The process may be conducted either batchwise or continuously. As a batch process a static molten fluoride salt mixture, which is maintained at about 600° C., is brought in contact with a quantity of high surface iron and permitted to achieve equilibrium. Thorium metal is then added to the molten salt mixture to effect a reduction of the protactinium fluoride after which the protactinium metal is sorbed on the steel wool. In a continuous process the molten fluoride salt mixture, to which the reductant is added, is circulated through a column containing a packed bed of steel wool to remove the protactinium from solution. To insure that all of the protactinium fluoride has been reduced to metal it is preferred that a large excess of the reductant be added at the head-end of the column and that sufficient residence time of the salt in the packed steel wool column be allowed for effective retention of protactinium on the steel surfaces. Since thorium metal is very sparingly soluble in the molten fluoride at process temperatures and is essentially inert toward the major constituents of the salt mixture, large excesses of the reductant will not prohibitively alter the chemical composition of the blanket salt stream.

After removal of the protactinium from solution the steel wool, containing sorbed protactinium, may be reprocessed to recover the protactinium from the steel wool. This may be achieved, for example, by hydrofluorinating the steel wool in the presence of a suitable barren molten salt. Here the protactinium metal is converted to soluble protactinium fluoride which goes into solution with the barren salt. Advantageously, this reprocessing scheme permits the accumulation of protactinium from several runs in the barren salt which can be stored outside the reactor to facilitate the decay to $^{233}$U. Then the $^{233}$U can be recovered from the salt by conventional volatility techniques such as by fluorination of the salt above its liquidus temperature with fluorine gas to convert the uranium tetrafluoride to the volatile uranium hexafluoride. Another method for recovering the sorbed products is to store the steel wool outside the reactor for a period of time sufficient to permit conversion of essentially all of the $^{233}$Pa to $^{233}$U, which requires up to 270 days, and then fluorinate the steel wool directly with fluorine gas thereby removing the uranium values as the volatile hexafluoride.

The molten salt compositions which may be reprocessed to remove dissolved protactinium values therefrom, in accordance with the invention, may vary widely and may comprise either blanket or core compositions (i.e., single region fuel). Non-limiting examples of these salt compositions include fluorides of the alkali metals, such as potassium fluoride, sodium fluoride, and lithium fluoride; beryllium fluorides; and zirconium fluorides as molten mixtures with thorium fluoride and uranium tetrafluoride.

Having described the invention in general terms the following example will more fully explain the invention with regard to the quantitative aspects and procedures.

EXAMPLE

The feasibility of removing dissolved protactinium values from molten fluoride salt mixtures by reduction with thorium metal and sorption on steel wool was established by the following experiment. A reactor vessel comprising a 12-inch section of a 2-inch diameter stainless steel pipe fitted with a low-carbon steel liner was packed with steel wool (having a surface area of approximately 5.9 m.$^2$) to a depth of approximately 4 inches. The vessel was penetrated by a ¼-inch O.D. tube which extended near the bottom and served as a gas sparge line and as a salt transfer line. The packed column was heated to 800° C. in an atmosphere of flowing helium and treated with hydrogen to reduce the metal oxides.

A mixture of LiF-BeF$_2$-ThF$_4$ (73–2–25 mole percent) was prepared containing 1.5×10$^4$ counts per minute of $^{233}$Pa per gram of salt mixture (<1 p.p.m.). The mixture was given the conventional HF-H$_2$ treatment to convert any oxides to fluorides. A portion (1.342 kg.) of the salt mixture was transferred to the reactor vessel and the temperature maintained at 600° C. for a period of 40 hours prior to the addition of thorium metal which served as the reductant.

Samples were withdrawn periodically from the salt mixture to determine the stability of the salt in the presence of steel wool. It was found by analysis that approximately 20% of the $^{233}$Pa was lost immediately from the salt with the loss being probably attributable to oxide formation caused by unreacted metal oxides in the reactor vessel; after about 1 hour, however, the $^{233}$Pa activity remained stable during the balance of the contact period.

After equilibrium was established between the salt and steel wool, 5 grams of thorium metal chips was added to the system to effect reduction of the protactinium which is present as protactinium fluorides. Filtered samples (~10 grams each) were taken at $t$=0.5, 1.0, 2.0, and 24 hours and analyzed for $^{233}$Pa by measuring the 310 kilovolt peak with a single channel gamma spectrometer.

The results indicate that an immediate and essentially complete removal of the protactinium from the salt mixture was achieved within 0.5 hour. The vessel was then drained through a sintered nickel filter and no $^{233}$Pa was found either on the filter or in the filtered salt mixture. Essentially all of the $^{233}$Pa was collected on the steel wool.

It is understood that the foregoing example is merely illustrative and is not intended to limit the scope of this invention, but the invention should be limited only by the scope of the appended claims.

We claim:

1. A method for reprocessing molten metallic fluoride salts selected from the group consisting of LiF, NaF, KF, RbF, CsF, BeF$_4$, ZrF$_4$, ThF$_4$ and UF$_4$ containing protactinium values dissolved therein comprising the steps of adding a minor quantity of thorium metal to said salt to reduce said protactinium values to metal and thereafter contacting said salt with finely divided iron to thereby sorb said protactinium metal thereon.

2. The method of claim 1 wherein said finely divided iron comprises steel wool.

3. The method of claim 1 wherein said protactinium is $^{233}$Pa.

4. The method of claim 1 wherein said molten metallic fluoride salt is LiF-BeF$_4$-ThF$_4$ (73–2–25 mole percent).

5. The method of claim 4 wherein said molten metallic fluoride salt contains dissolved $^{233}$Pa in concentrations of from 25–50 p.p.m.

6. The method of claim 1 wherein said reprocessing method is conducted at a temperature between salt liquidus temperature and 900° C.

7. The method of claim 1 wherein said finely divided iron containing sorbed protactinium is removed from said contacting step, stored for a period of up to 270 days to permit decay of the protactinium to uranium, and thereafter directly fluorinated with fluorine gas to thereby recover said uranium as a volatile hexafluoride product.

8. The method of claim 1 wherein said finely divided iron containing sorbed protactinium is contacted with a separate barren molten metallic fluoride salt and hydrofluorinated with HF at a temperature between the salt liquidus temperature and 900° C., removed from said contacting step stored for a period of up to 270 days to permit decay of the protactinium to uranium, and thereafter directly fluorinated with fluorine gas at a temperature between the salt liquidus temperature and 900° C. to thereby recover said uranium as a volatile hexafluoride product.

References Cited

UNITED STATES PATENTS 3,278,387  10/1966  McNeese et al. _____ 23—352

OTHER REFERENCES

R. B. Briggs: Molten-Salt Reactor Program Semi Annual Progress Report, June 1966, pp. 147–152. ORNL 3936.

J. H. Shaffer, D. M. Moulton, W. K. R. Finnell, W. P. Tiechert, F. F. Blankenship, W. R. Grimes: Removal of Protactinium from Molten Fluorides by Reduction Processes, March 1967, pp. 36–38, ORNL 4076.

C. J. Barton, H. H. Stone: Protactinium Studies in High Alpha Molten-Salt Laboratory, March 1967, pp. 39–41, ORNL 4076.

R. K. Steunenberg, R. C. Vogel: Fluoride and Other Halide Volatility Processes, Reactor Handbook, vol. II, Fuel Reprocessing, 1961, Interscience Publishers Inc., New York, pp. 254, 273–74.

CARL D. QUARFORTH, *Primary Examiner.*

M. J. McGREAL, *Assistant Examiner.*